United States Patent [19]

Menne

[11] Patent Number: 5,497,489
[45] Date of Patent: Mar. 5, 1996

[54] DATA STORAGE AND RETRIEVAL SYSTEMS HAVING LABELLING FOR DATA

[76] Inventor: David M. Menne, 10 Mayfair Street, Mount Claremont, Western Australia, Australia

[21] Appl. No.: 479,790

[22] Filed: Jun. 7, 1995

Related U.S. Application Data

[63] Continuation of Ser. No. 109,451, Aug. 19, 1993, abandoned, which is a continuation of Ser. No. 427,504, Oct. 27, 1989, abandoned, which is a continuation-in-part of Ser. No. 46,089, May 5, 1987, abandoned.

[30] Foreign Application Priority Data

Oct. 27, 1988 [AU] Australia .................. PJ1185

[51] Int. Cl.$^6$ ................................. G06F 17/30
[52] U.S. Cl. ................................. 395/600
[58] Field of Search ............................ 395/600

[56] References Cited

U.S. PATENT DOCUMENTS 4,817,036  3/1989  Millett et al. ............. 364/900
5,010,478  4/1991  Deran ....................... 364/200

OTHER PUBLICATIONS van Rijsbergen "Information Retreval" Buttterworths pp. 5, 33, 81–92 (1975).

A. Barr & E. Feigenbaum, eds. The Handbook of Artificial Intelligence vol. 2, Addison–Wesley, pp. 87–101, pp. 177–193. 1982.

Primary Examiner—Thomas G. Black
Assistant Examiner—Peter Y. Wang
Attorney, Agent, or Firm—Bachman & LaPointe

[57] ABSTRACT

A data storage and retrieved system and process for use with structural items of data relying on associative indexes to connect related items of data and not to connect unrelated items of data. The associative indexes being formed from mathematical and/or boolean expressions for allowing know-how of a expert, stored in the system, to be extracted and put into context to a particular situation by a user inputting choices among alternatives and data into the system.

5 Claims, 13 Drawing Sheets

PAGE A                                                    CHOICE page

QUIT      EDIT      MOVE      AUDIT

```
    THIS DEMONSTRATION CONCERNS GOLD CYANIDATION IN
  STIRRED TANKS.  YOU CAN INFER LEACH KINETICS FROM PLANT.

INFER LEACH KINETICS FROM PLANT DATA       I(1)
  DEVELOP OPTIMISED DESIGN                   I(1)
  ASSESS IMPACT OF CONTROLLABLE VARIALBLES   I(1)
                                             I(1)
                                             I(1)
                                             I(1)
                                             I(1)
                                             I(1)

PAGE AA                                                    INPUT page

| THIS MODULE OF EXPERTISE SHOWS HOW EASY INTERACTIVE OPERATION IS. LEACH INFORMATION IS DERIVED FROM PLANT DATA. | |
|---|---|
| SOLIDS RESIDUE OUT OF LAST [g Au/[ <br> SOLIDS RESIDUE OUT OF 2nd – LAST TANK [g/Au/] <br> SOLIDS RESIDUE OUT OF 3rd – LAST TANK [g Au/] <br> SOLIDS RESIDUE OUT OF 4th – LAST TANK [g Au/] <br> SOLIDS RESIDUE OUT OF 5th – LAST TANK [g Au/] <br> NUMBER OF TANKS ABOVE 5th TANK [DIMENSIONLESS] <br> HEAD GRADE[g Au/t] <br> SLURRY RESIDENCE TIME PER TANK [HOUR] | I (1) <br> I (2) <br> I (3) <br> I (4) <br> I (5) <br> I (6) <br> I (7) <br> I (8) |
| M1   I (1)/I(2) <br> M2   I (2)/I(3) <br> M3   I (3)/I(4) <br> An1  ((M2 ^ 2−MI* M3)/ (2* M3) | |
| L (1)  Au I < 0 AND KI < 0.03 <br> L (2)  Au I < 0 AND KI > 0.3 <br> L (3)  Au I < 0 <br> L (4)  K < 0.03 | ◇ <br> ◇ <br> ◇ <br> ◇ |

PAGE AAA                                                    INFORMATION page

ALL THE GOLD IS SOLUBLE — ALBEIT SLOWLY. ONLY THE SLOW
LEACHING FRACTIONS HAVE BEEN EVALUATED, SINCE ONLY THIS
FRACTION IS OF IMPORTANCE ION ASSESSING FINAL RESIDUES AND
INCREMENTAL RECOVERIES. THE SLOW LEACHING GOLD HAS BEEN
FITTED WITH A FIRST-ORDER RATE MODEL. WHERE THE SOLUTION
TENORS AT THE TOP OF THE CIRCUIT ARE IMPORTANT., e.g. TO
DETERMINE AVAILABLE CARBON LOADINGS, THE FAST LEACHING
FRACTION ALSO NEEDS TO BE ASSESSED

THE RELATIVELY SLOW RATE CONSTANT INDICATES THAT REMOVAL OF
COARSEGOLD, PRETREATMENT OR ALTERING THE LEACH.

| | |
|---|---|
| HEAD GRADE [g Au/t] | AuH |
| SLOW LEACHING FRACTION | FS1 |
| RATE CONSTANT OF SLOW LEACHING FRACTION [1 HOUR]    62 | K1    60 |

PAGE A
___

THIS DEMONSTRATION CONCERNS GOLD CYANIDATION IN STIRRED TANKS. YOU CAN INFER LEACH KINETICS FROM PLANT DATA, OR EXAMINE THE TYPICAL INFLUENCE AT FULL SCALE OF VARIABLES SUCH AS:

NUMBER OF TANKS          TANK VOLUME
AGITATION POWER INPUT    FEED RATE
SOLIDS DENSITY           CYANIDE CONCENTRATION
pH                       DISSOLVED OXYGEN LEVELS
AMBIENT TEMPERATURE

SELECT ONE OF THE CHOICES BELOW:

| INFER LEACH KINETICS FROM PLANT DATA |

DEVELOP OPTIMISED DESIGN

ASSESS IMPACT OF CONTROLLABLE VARIABLES

PAGE AA
_____

| THIS MODULE OF EXPERTISE SHOWS HOW EASY INTERACTIVE OPERATION IS.  LEACH INFORMATION IS DERIVED FROM PLANT DATA.  A GRAPHICAL PLOT:<br><br>   LOG (HEAD GRADE 1 [RESIDUE ASSAY]) VERSUS [TANK NUMBER] IS SUGGESTED TO SMOOTH THE DATA FROM THE LAST FIVE TANKS. POINTS ARE READ OFF THE CURVE AT EACH TANK NUMBER AND | |
|---|---|
| INPUT DATA REQUIRED:<br><br>SOLIDS RESIDUE OUT OF LAST TANK [g Au/t]<br>SOLIDS RESIDUE OUT OF 2nd − LAST TANK [g Au/t]<br>SOLIDS RESIDUE OUT OF 3rd − LAST TANK [g Au/t]<br>SOLIDS RESIDUE OUT OF 4th − LAST TANK [g Au/t]<br>SOLIDS RESIDUE OUT OF 5th − LAST TANK [g Au/t]<br>NUMBER OF TANKS ABOVE 5th TANK [DIMENSIONLESS]<br>HEAD GRADE [g Au/t]<br>SLURRY RESIDENCE TIME PER TANK [HOUR] | <br><br>0.0000<br>0.0000<br>0.0000<br>0.0000<br>0.0000<br>0.0000<br>0.0000<br>0.0000 |

PAGE AAA

---

ALL THE GOLD IS SOLUBLE — ALBEIT SLOWLY. ONLY THE SLOW LEACHING FUNCTIONS HAVE BEEN EVALUATED, SINCE ONLY THIS FRACTION IS OF IMPORTANCE IN ASSESSING FINAL RESIDUES AND INCREMENTAL RECOVERIES., THE SLOW LEACHING GOLD HAS BEEN FITTED WITH A FIRST-ORDER RATE MODEL. WHERE THE SOLUTION TENORS AT THE TOP OF THE CIRCUIT ARE IMPORTANT, e.g. TO DETERMINE AVAILABLE CARBON LOADINGS, THE FAST LEACHING FRACTION ALSO NEEDS TO BE ASSESSED.

THE RELATIVELY SLOW RATE CONSTANT INDICATES THAT REMOVAL OF COARSEGOLD, PRETREATMENT OR ALTERING THE LEACH CONDITIONS BE CONSIDERED. REFER TO THE ELECTROMAGNETIC BOOK IN IMPROVING GOLD EXTRACTION.

---

| | |
|---|---|
| HEAD GRADE [g Au/t] | 0.0000 |
| SLOW LEACHING FRACTIONS | 0.0000 |
| RATE CONSTANT OF LOW LEACHING FRACTION [1 HOUR]   130 | 0.0000   128 |

PGDN: NEXT PAGE   PGUP: PREVIOUS PAGE   W: WINDOWSIZE
HOME: FIRST PAGE   END: EXIT

DATA STORAGE AND RETRIEVAL SYSTEMS HAVING LABELLING FOR DATA

CROSS-REFERENCE TO RELATED APPLICATIONS

This application is a continuation of application Ser. No. 08/109,451, now abandoned, filed Aug. 19, 1993, which is a continuation of application Ser. No. 07/427,504, filed Oct. 27, 1989, now abandoned, which is a continuation-in-part of application Ser. No. 07/046,089, filed May 5, 1987, now abandoned.

FIELD OF THE INVENTION

The present invention relates to a data storage and retrieval system particularly of a type herein conventionally referred to as electromagnetic books (EMB). The present invention more specifically relates to the field of computerised decision support. EMB's are characterised by capturing know-how of an expert and making it available to non experts who insert data into the EMB's at the time of use. The data input then alters the response of the EMB. EMB may be applied to a variety of applications such as

| Type | Definition |
| --- | --- |
| Diagnosis | Inferring the cause of a malfunction or deviation from available information. |
| Prescription | Recommending cures for the malfunction of a system, or a deviation from desired performance. |
| Selection | Identifying the most appropriate choice among a fixed number of possibilities. |
| Prediction | Inferring the likely consequences of an action or set of actions. |
| Situation Analysis | Inferring the state of a system by analysis of available data and information. |
| Instruction | Conveying know-how or expertise to a student. |
| Control | Monitoring, interpreting and taking corrective action. |
| Scheduling and Planning | Developing a sequence of actions and their timing to achieve a desired result at a specified time. |
| Design | Configuring component parts under constraints to meet the specifications of an overall system. |

BACKGROUND OF THE INVENTION

It is to be noted that there is a great practical difference between "information" and "know-how" for the purpose of the present invention. "Information" is the collection of a group of facts whether related or unrelated on a subject or field. Whereas "know-how" is that "information" put into context relative to specific applications. That is "know-how", herein, also contains that which is added to identify the relationships between all the items of "information" and relate these that are important and discard those that are irrelevant for a specific application.

It is known to use Expert Systems (ES's) to attempt to store know-how. To set up an ES an expert in a particular field must develop "rules" concerning the field. The rules may be considered as a collection of situation-action rules, each of which captures a single inference or action for a particular type of situation.

A user of an ES asks questions either in free form text or in a special language. The ES answers such questions from its store of rules. Generally the ES will produce an answer to the question however there is no guide to the validity of the answer. That is the ES does not know the boundaries of its own know-how.

Accordingly, when using the ES, specialists in the field of the know-how, of a skill level approaching that of the expert, are required to provide context for the extracted information to determine the validity thereof and hence provide valuable know-how. Naive users or users inexperienced in the field cannot provide such contexts and the validity of the resultant know-how provided by the ES to them is therefore doubtful and approaches mere information.

Also, once an ES is set up validation of its rules require an enormous investment of time and effort since all possible questions must be put to the ES to determine the correctness of the answers.

Further, to set up an ES requires an expert in ES's. This adds to the time and cost involved.

Still further, to develop each rule in the ES is very time consuming. It may take a day to develop one rule. Hence, ES's tend to be applied to very narrow fields of expertise, which add to the know-how boundary problem stated above. Still further, ES's have great difficulty in associating related information in their store of know-how. Addition of new know-how to an ES is a massive task; increasing with each further addition.

Basically, ES's lack the common sense that would define its know-how boundaries. Such common sense in an ES could only be achieved by a very broad know-how base, which by its size increases the risk of error and difficulty of guarding against this.

The ultimate problem in using an ES is to know the correct question to ask to get the correct answer to a given problem. That is the skill of the user is critical to the success of using the ES.

SUMMARY OF THE INVENTION

In the EMB of the present invention the expert is able to set up the EMB without help from an expert in the field of EMB's. Also by the nature of the EMB the expert can set his/her "common sense" into EMB and clearly define the know-how boundaries.

The EMB achieves this by giving the user choices set by the expert who set up the EMB. Together with the choices the expert embeds mathematical and boolean or logic expressions which respond to the users answers to the choices and determine the further responses.

The boolean expressions embedded in the EMB provide associative indexing of related information and hence the EMB can readily be asked for more information or explanation.

This is in contrast to an ES where new, more explicit questions must be devised by the user to gain same. Put another way each item of data in the EMB has label's by way of the mathematical and boolean expressions, which defines or reflects the relationship or associations with other items of data, each item of data and its associate index being stored together.

More simply, the mathematical and boolean expressions provide a context for the individual items of information with respect to each other (where appropriate) so as to provide the experts know-how inherent with each item of information.

By virtue of such a construction an EMB can determine when a user's answers are meaningless or contradictory and can to thus indicate to the user where its know-how is limited. Accordingly, EMB's of the present invention are relatively easy to set up and use and also to edit and update. Also the need for a special language to set up the EMB can be avoided.

Further, all the know-how in the EMB can readily be printed out and its use can be audited.

The present invention provides a data storage and retrieval system having labelling for data capable of registering the association between related data records within the data records themselves.

The benefits, which are absent from conventional data files and known expert systems, are achieved by storing with each item of data a label which defines or reflects the relationship or association that the said item of data has with other items of data. Such indexing is herein referred to as "associative indexing", and the storage of an item of data together with such a label is herein referred to as "embedding".

The invention is applicable to items of data which have related features, wherein it is desired to be able to retrieve the related items of data of a particular item of data. Items of data having interrelationships are herein referred to as "structured data". Structured data is characterised by having superordinate and subordinate items of data which are more general and more specific respectively.

Groups of the superordinate and subordinate items of data are herein termed "classes of information" there being a major class of information, one or more subordinate classes of information and one or more superordinate classes of information. Each item of data in the major class of information in a structured set of information may have a subordinate class of information referred to as a second class of information.

In turn, each item of data in the subordinate class of information may have a subordinate class of information, referred to as a third class of information and so on. Each class of information except the major class may also have a superior class of information. For example, the second class of information is superior to the third class of information and the major class of information is superior to the second class of information. There is no class of information superior to the major class.

In accordance with one aspect of the present invention there is provided a process for indexing of structured items of data in a data storage and retrieval system, the process comprising the steps of generating boolean expressions relating to each item of data for associatively indexing each item of data with related items of data in subordinate classes of information and in the same class of information and for distinguishing each item of data from other non related items of data in the same class of information, labelling each item of data with the corresponding associative indexes, storing the item of data in a general data memory unit in an indexed data memory unit of the data storage and retrieval system, and embedding the associative indexes with each item of data in the indexed data memory unit, there being one associative index generated for each boolean expression.

In accordance with another aspect of the present invention there is provided a process for storage of structured data in a data storage and retrieval system, the system capable of containing items of data stored in classes of information arranged on a hierarchical structure consisting of a major class of information and subordinate classes of information in an indexed data memory unit of the data storage and retrieval system, the process comprising the steps of:
a) allowing input of an item of data via an input device into the data storage and retrieval system;
b) generating an associative index for the item of data to associate the item of data with items of related data contained in subordinate classes of information and in the same class of information and to distinguish the item of data from other items of data in the same class of information;
c) labelling the item of data with the associative index;
d) storing the item of data in a general data memory unit in the indexed data memory unit;
e) embedding the associative index with the item of data in the indexed data memory unit;
f) repeating steps (a) to (e) supra for all remaining subordinate classes of information in order of decreasing superiority;
g) repeating step (f) supra for the most subordinate class of information until all such items of data are stored for said most subordinate class of information; and
h) repeating steps (f) and (g) supra for the next superior class of information until all items of data relating to all of the class of information have been stored.

In accordance with another aspect of the present invention there is provided a process for editing of structured data in a data storage and retrieval system, the system comprising items of data stored in classes of information arranged in hierarchical structure consisting of a major class of information and subordinate classes of information in an indexed data memory unit of the data storage and retrieval system, each of the item of data having an associative index embedded with it to associate the item of data with related items of data contained in subordinate classes of information and in the same class of information and to distinguish the item of data from other non related items of data in the same class of information, the process comprising the steps of:
a) allowing selection of one of the items of data to be edited from one of the classes of information;
b) applying the associative index to locate the item of data to be edited in the indexed data memory unit;
c) allowing editing of the item of data located in step (b) supra; and where the editing involves deleting of the items of data;
d) applying the associative index for the item of data to locate all related items of data in subordinate classes of information; and
e) deleting the related items of data located in step (d) supra.

In accordance with another aspect of the present invention there is provided a process for retrieval of structured data from a data storage and retrieval system, the system comprising items of data stored in classes of information arranged in a hierarchical structure consisting of a major class of information and subordinate classes of information in an indexed data memory unit of the data storage and retrieval system, each of the items of data having an associative index embedded with it to associate the item of data with related items of data contained in subordinate classes of information and in the same class of information and to distinguish the item of data from other non related items of data in the same class of information, the process comprising the steps
a) displaying items of data in the most superior class of information on an output device of the data storage and retrieval system;

15b) allowing selection of one of the items of data from the class of information;

c) determining the associative index therefor;

d) locating the related items of data for the selected items of data using the associative index;

e) displaying the selected items of data located for the selected class of information on the output device;

f) allowing selection of items of data from superior or subordinate classes of information with respect to the selected class of information; and g) repeating steps (b) to (f) supra to retrieve those items of data from the superior or subordinate classes of information.

In accordance with another aspect of the present invention there is provided a data storage and retrieval system capable of containing items of data stored in classes of information arranged in a hierarchical structure consisting of a major class of information and subordinate classes of information, each of the items of data having an associative index embedded with it to associate the item of data with related items of data contained in subordinate classes of information and in the same class of information and to distinguish the item of data from other non related items of data in the same class of information, the system comprising:

a) an input device configured for allowing input of the items of data for storage;

b) an output device configured for output of retrieved items of data;

c) a working memory unit for intermediate storage of the items of data;

d) an indexed data memory unit having a general data memory and an associative index means;

e) the associative index means configured for:

(i) generating an associative index for each item of data;

(ii) labelling the item of data with the associative index;

(iii) embedding the associative index with the item of data in the general data memory unit; and (iv) allowing selection, retrieval and deletion of each item of data by determining the associative index for movement between the related items of data; and f) a processor unit connected to the input device, the output device, the working memory unit, the indexed data memory unit and the instructions unit so as to control communication between each said unit of the data storage and retrieval system in conjunction with instructions stored in the instruction unit.

BRIEF DESCRIPTION OF THE DRAWINGS

The present invention will now be described, by way of example, with reference to the accompanying drawings in which:

FIGS. 8, 9 and 10 are screens similar to those of FIG. 3 but corresponding to Example 1; and FIGS. 11, 12 and 13 are screens similar to those of FIG. 5 but corresponding to Example 1.

DESCRIPTION OF THE INVENTION

Figure 1:
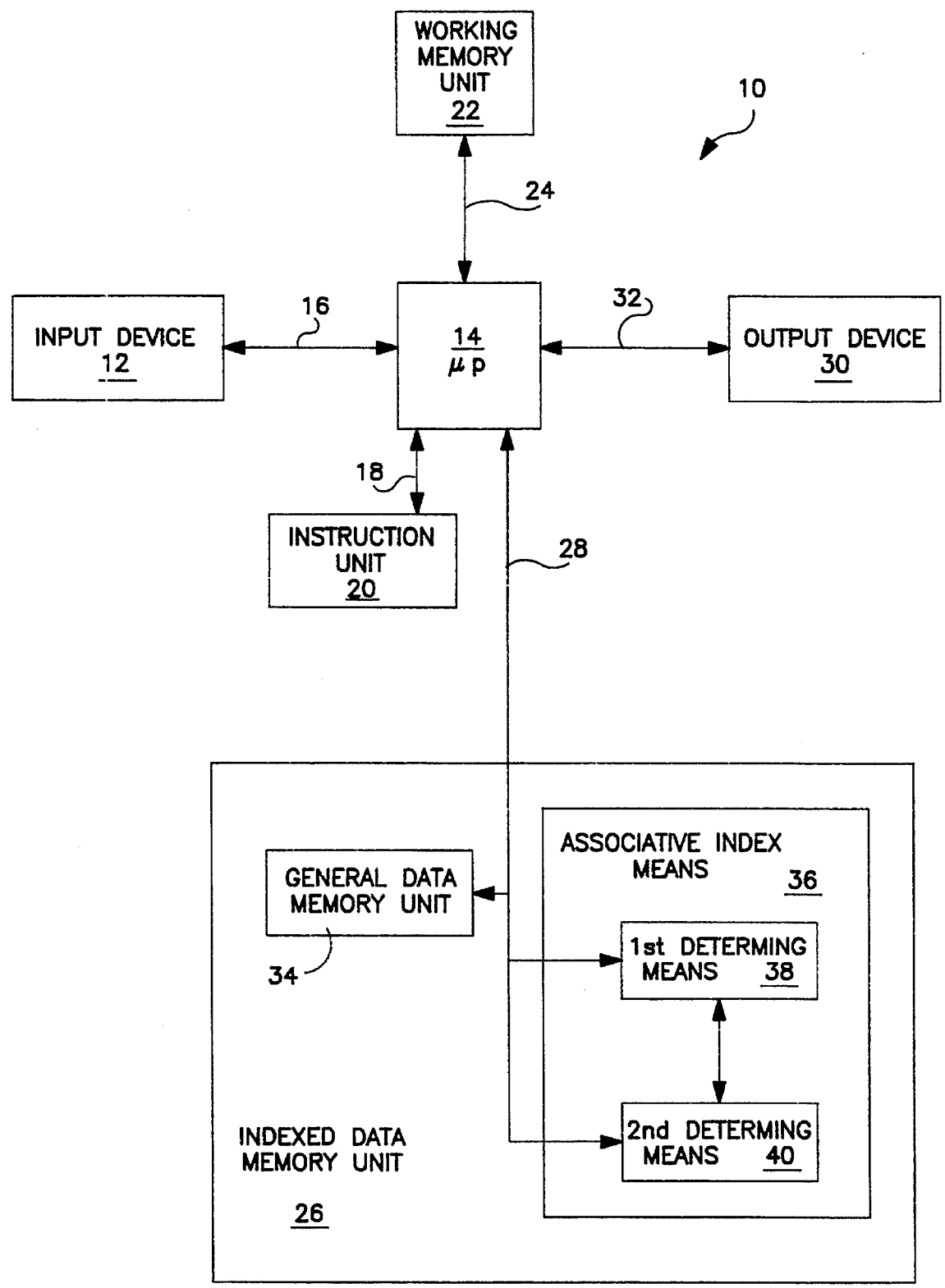
FIG. 1 is a block diagram of a data storage and retrieval system in accordance with the present invention.

In FIG. 1 there is shown a data storage and retrieval system 10 comprising an input device 12, connecting to a processor unit 14 via a bus 16, a bus 18 connecting the processor unit 14 to an instruction unit 20, a working memory unit 22 connected via a bus 24 to the processor unit 14, an indexed data memory unit 26 connected to the processor unit 14 via a bus 28 and an output device 30 so connected to the processor unit 14 by a bus 32.

The input device 12 may be a conventional keyboard, a data input port, a microphone, an acoustic coupler, a barcode reader or the like.

The instruction unit 20 contains program instructions which control the operation of the processor unit 14 in accordance with the processes of the present invention.

The working memory unit 22 is configured to store items of data intermediate to storage and retrieval of data from the system 10, such as, for example, in RAM.

The indexed memory unit 26 comprises a general data memory unit 34, and an associative index means 36 having a first determining means 38 and a second determining means 40. The general data memory unit 34 is configured to store items of data provided with associative indexes by the first and second determining means 38 and 40. The items of data are the "information" of the present invention and when combined with the associative indexes become the "know-how" of the present invention.

The output device 30 may be a conventional VDU, a printer, a loudspeaker, a modem, or the like, and is configured to output data retrieved from the indexed data memory unit 26.

The first determining means 38 comprises mathematical expressions interrelating items of data in the general data memory unit 34. The first determining means 38 generates real and/or complex variables.

The second determining means 40 comprises boolean expressions interrelating the items of data and also relying on the real and/or complex variables from the mathematical functions in the first determining means 38. The second determining means 40 generates, from the boolean expressions and logical variables such a True or False. The first determing means 38 may also determine estimates of the probabilities of how True or False any of these boolean expressions are.

It is to be noted that the first determining means 38 generates indirect indexes for the data and the second determining means 40 generates direct indexes. The indirect and direct indexes collectively constitute the associate indexes.

The associative index means 36 is configured to take data input via the input device 12 and/or the working memory unit 22, via the buses 16, 24 and 28, and apply the input to the first determining means 38 to determine the real and/or complex variables from the mathematical expressions and then to apply some or all of these to the second determining means 40 to determine the logical variables.

It is to be noted that in some cases there will be no mathematical expressions.

The associative index means 36 is also configured to use only the logical variables to locate subordinate and/or superior associated items of data in the general data memory unit 34. Of course where mathematical expressions of the first determining means 38 are incorporated into the second determining means 40 the variables created by the first determining means will determine the triggering of the logical expressions and so indirectly provide indexing. The indexed data memory unit 26 is configured to allow movement between the screens 42 using the associative indexes. The movement is by movement commands including FIRST, NEXT and PREVIOUS, as described in detail hereinafter.

The indexed data memory unit 26 is also configured to allow editing of the screens 42 and of the structure of the tree. The former involves adding and amending data in to the screens 42 and the latter involves adding and deleting screens 42 in single or as associated by the indexes.

The indexed data memory unit 26 is still further configured to allow replication of parts of branches or of screens 42 in other branches so as to save time in creation by an expert where only minimal changes are required to the replicated screens.

The associated index means 36 is further configured to allow for rearrangement of the order of the boolean expressions and hence their execution so as to alter the way in which the know-how is presented to a user. The associative index means 36 is further configured to allow cross-linking of branches of the items of data such that items of data common to one branch may be referred to by the associative indexes without the need for replication.

The data in the general data memory unit 34 may be represented at the output device 30 as text, such as relating to a particular subject or field, such as, for example, relating to gold cyanidation in stirred tanks as well as quantitative data—as shown in Example 1.

Figure 2:
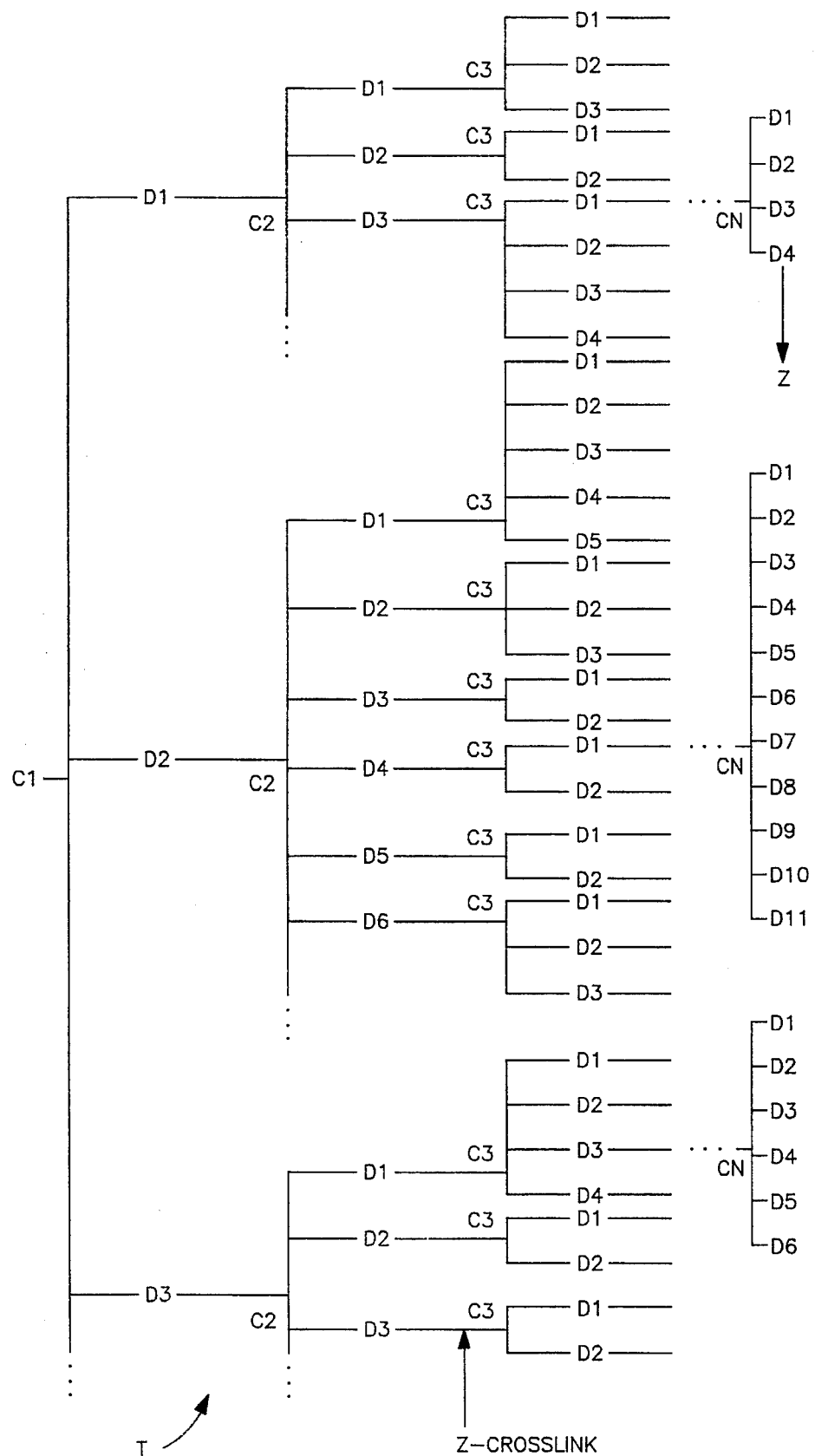
FIG. 2 is a tree diagram of a storage organisation of data in the system of FIG. 1.

The indexed data memory unit 26, in one embodiment, may be configured to store items of data in a hierarchical tree structure T, such as, for example, as shown in FIG. 2. The tree T comprises a plurality of classes of information arranged in a hierarchical structure. In FIG. 2 the hierarchy has its top at the left hand side of the page and its base at the right hand side of the page.

Each vertical line of the tree T represents a member of a class of information and where the vertical lines align vertically the entire class of information is represented.

The classes of information are for the purposes of FIG. 2 denoted C1, C2, C3 . . . CN.

The major class of information C1 has, in FIG. 2, only one member.

Each horizontal line of the tree T represents an item of data or information. Items of data in a particular member of a class of information are for the purposes of FIG. 2 denoted D1, D2m D3 . . . DM.

In use, the present invention 10 is provided with data by an expert in a particular field. The expert enters alphanumeric text with the input device 12 to the general data memory circuit 34 via the processor unit 14, the working memory unit 22 and the buses 16, 24 and 28 under control of the instruction unit 20.

The instruction unit 20 controls the processor unit 14 to store the items of data into, for example, the tree structure T shown in FIG. 2.

Figure 3:
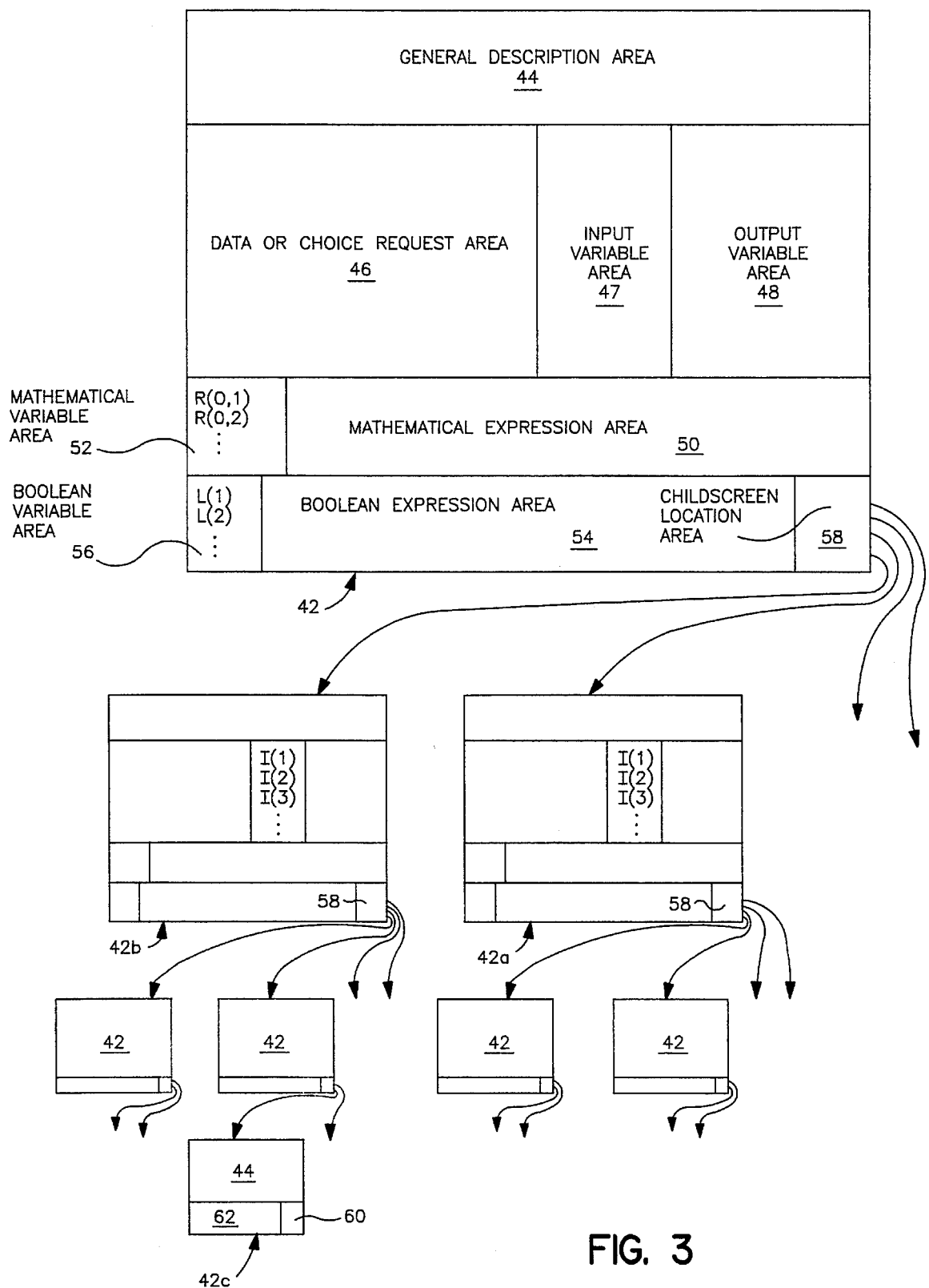
FIG. 3 is a process representation of screens of an output device of the system of FIG. 1 shown in use in an Expert mode of operation.

As shown in FIG. 3 a VDU of the output device 30 is controlled by the instruction means 20 to display a screen 42 in an Expert mode of operation of the system 10 for storage and editing of items of data by an expert in a particular subject or field. The screen 42 comprises a general description area 44, a data or choice request area 46 an input variable area 47, an output variable area 48, a mathematical expression area 50, a mathematical variable area 52, a logical expression area 54, a logical variable area 56 and a childscreen location area 58.

These may be shown individually or in any combination using well known Window techniques.

The general description area 44 is for receiving general information and guidance from the expert concerning the subject or field. The data or choice request area 46 is for receiving comments from the expert seeking input of data or choices by a user and relate to the general information provided in the general descriptions area 44. The input variable area 47 is for receiving data variables or choice variables specified by the expert and relating to the description area 44. The mathematical expression and variable areas 50 and 52 are for receiving mathematical expressions and variables from the expert relating to the information in the general description area 44 and using the variables in the input variable area 47. The logical expression and variable areas 54 and 56 are for receiving logical expressions and variables relating to the general information in the general description area 44, the input variables in the input variable area 47 and the mathematical variables in the mathematical variable area 52. The child screen location areas 58 typically receive flags to indicate the existance of a child screen 42 and pointers generated by the associative index means 36 under control of the instruction unit 20 to indicate the location of the childs screen 42.

There are three types of screens 42, namely, choice screens 42a (see FIG. 8), input screens 42b (see FIG. 9) and information screens 42c (see FIG. 10).

In the choice screens 42a of FIG. 8 the instruction unit 20 relies on the areas 46 and 47 for input of data and/or options from the expert via the input device 12. The areas 54 and 58 of the choice screen 42a used to associatively index the screen 42 to other relevant screens 42. Choice screens 42a may also have mathematical expressions even though associative indexing with childpages is purely by choice, that is by logical expressions derived from input variables I (1). This can occur where the choice screen 42a is preceded by an input screen 42b which generates mathematical variables and has input variables. Thus, the choice screens 42a may also rely on the areas 50 and 52. In the input screens 42b the instructions unit 20 relies on all of the areas 44 to 58.

In the information screens 42b the instructions unit 20 relies on the area 44 and a mathematical output area 60 and a definition area 62 as shown in FIGS. 3 and 10 to output know-how which is in context to the particular application. The mathematical output area 60 is used to display mathematical expressions or variable values pertinant to the matter in the description area 44 and the definition area 62 provides definitions of the values as displayed.

The information screens 42b could also be configured for displaying know-how in graphical form, such as, for example, pie charts, bar graphs, line graphs, histograms and the like In such a case the instruction unit 20 is configured to allow the expert to choose the graph type, axes label, colour coding and the like.

Figure 4:
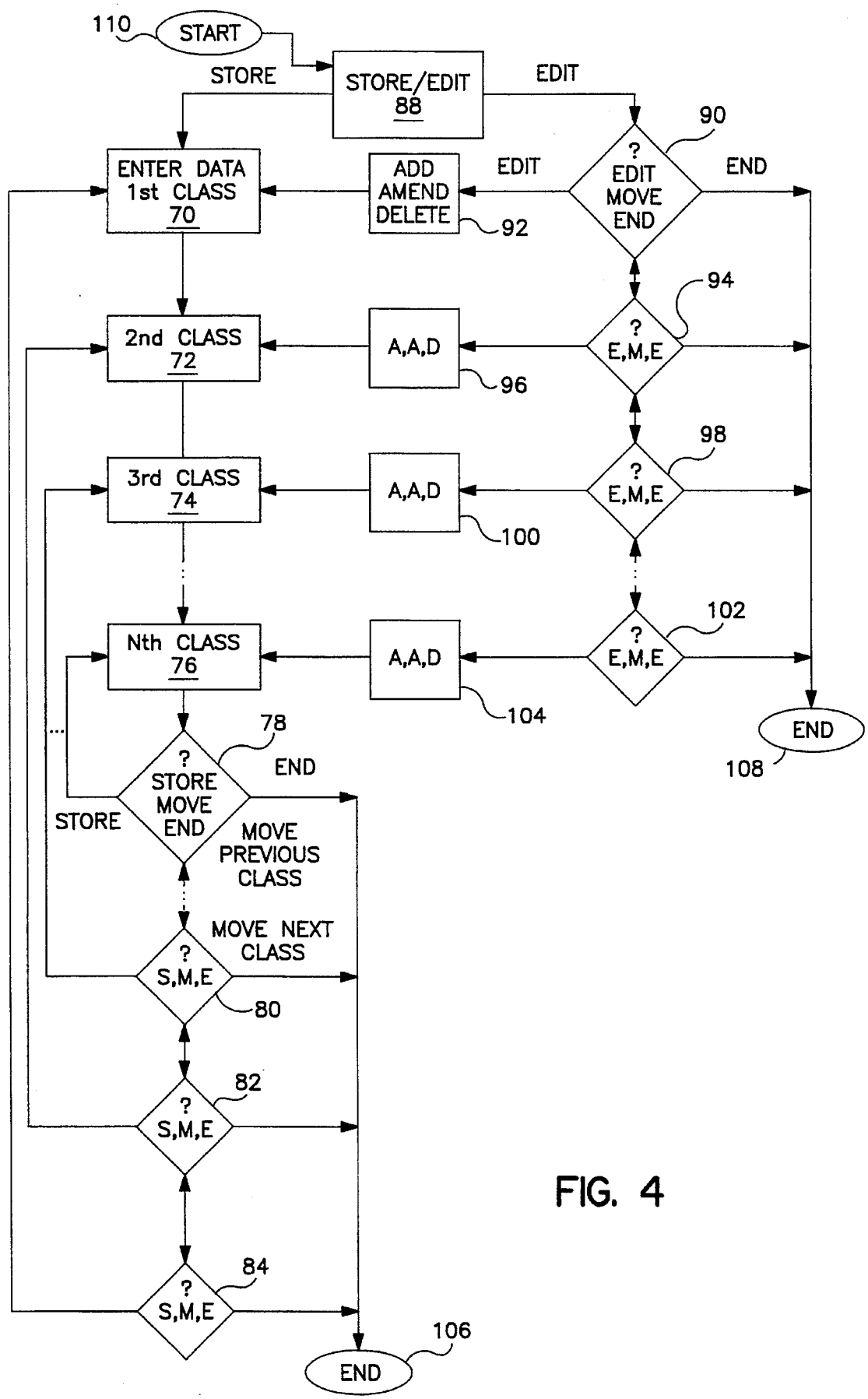
FIG. 4 is a flow diagram of operation of the system of FIG. 1 in the Expert mode where know-how is stored and edited.

The expert stores know-how about a particular subject or field by use of the following STORAGE process which is shown graphically in FIG. 4.

The flow diagram represents logical operation of the processor unit 12 under control of the instruction unit 20. In the preferred embodiment of the present invention the logic of the flow diagram is implemented as a series of instructions stored in the instruction unit 20. However, it is to be understood that the logic could be implemented as combinational logic performing under a special purpose processor or as microcode.

The steps of the storage process are represented by logic blocks numbered 70 to 84.

The logic blocks 70 to 84 may be considered in pairs. For example, logic blocks 70 and 84, 72 and 82, 74 and 80, and 76 and 78 may each be considered as pairs. Each pair of the logic blocks 70, 84 to 76, 78 forms a recursive loop and the recursive loops are nested one inside the other. In particular the recursive loop 76, 78 is nested inside the recursive loop 74, 80, which is nested inside recursive loop 72, 82, which is nested inside recursive loop 70, 84. An indeterminant number of recursive loops N are depicted in FIG. 4. Each pair of logic blocks 70, 84 to 76, 78 correspond to each class of information to C1 to CN respectively.

In practise the number of recursive loops will depend on the know-how being stored by the expert and need not be known in advance.

At the block 70 the processor unit 14 under control of the instruction unit 20 displays a screen 42 for the operator to insert a first item of data D1 for the first class of information C1 (herein abbreviated to item of data C1D1).

The expert then enters the item of data C1D1 via the input device 12 into the description area 44 of the screen 42, The data represents information on a subject or field. The inserted item of data C1D1 is temporarily stored into the working memory unit 22 as described hereinabove. The instruction unit 20 then directs the associative index means 36 to determine the associative indexes for the item of data C1D1.

The associative index means 36 for this purpose accepts mathematical expressions and variables to boolean expressions and variables from the expert relating to the item of data C1D1 and writes them into the areas 50 to 56 respectively and temporarily stores them in the working memory unit 22, It is to be noted that not all types of screens 42 (defined hereinabove) have all of these expressions and variables.

In the case of a choice screen 42a the expert inputs data input and choice information into the area 46, All the possible choices have a single corresponding variable I(1) as shown in FIGS. 3 and 8. The context of the data input and choice options may be determined by related know-how in superior screens 42 and for this reason the output variable area 48 may be used by the expert, That is the area 48 may present the user with derived quantitative data.

Alternatively the area 48 may be used to remind the user of data entered or derived earlier (or default data). There are no mathematical expressions for choice screens 42a that have no superior input screens 42b and in such a case the expert next inserts boolean expressions info area 54 corresponding directly to each of the choices.

For the choice screen 42a without mathematical expressions the boolean expressions represent the sole form of associative index, In the example in FIG. 8 there are three choices and hence three boolean expressions and thus three associative indexes.

In the case of an input screen 42b (and a choice screen 42a subordinate directly or indirectly to an input screen 42b) the expert also stores mathematical expressions and variables in the areas 50 and 52 and in the case of information screens 42c the expert stores the definitions and variables in areas 62 and 60.

The variables I(1) I(2) . . . are generated by the index data memory unit 26 depending on the type of page. That is I(1), I(1) . . . for choice pages 42a and I(1), I(2) . . . 1(8) for input pages 42b.

One associative index is provided by each boolean expression and may be affected by the mathematical expressions and variables and the input variables and output variables from the present as well as superordinate screens 42.

Once the associative indexes are determined they are attached to the item of data C1D1 by the processor unit 14 and then stored into the general data memory unit 34 of the indexes data memory unit 26, The associative indexed are to items of data C2D1, C2D2, C2D3 . . . , of the class of information C2.

The indexed data memory unit 26 is configured to provide movement commands for control by the instruction unit 20 for various movements between screens 42 stored in the general data memory unit 34. Typically, these may include FIRST, PREVIOUS, NEXT and DELETE to respectively move to the first page, move to the previous page, move to the next page and delete the present page.

These movement commands allow for easy passage through the screens 42 whilst storing know-how under the process of FIG. 4 as well as editing the structure of the system 10. Logic blocks 78 to 84 in FIG. 4 represent such movement commands together with commands for storing associatively indexed data and for ending storage of know-how.

By using the movement command NEXT control is transferred to the logic block 72, and the instruction unit 20 displays a screen 42 for the expert to insert a first item of data D1 for the second class of information C2 (herein abbreviates to item of data C2D1).

When the NEXT movement command is executed by the indexed data memory unit 26 to move to a new screen 42 to accept the item of data C2D1, it forms an associative index so as to establish a link between the two screens 42. The formation is performed by the indexed data memory unit 26, and is recorded by placing a flag 86 in the child screen area 58 of the previous screen 42. In the present embodiment, the flag is a diamond although other characters could be used.

At the same time the indexed data memory unit 26 requests which type of information screen 42a, 42b or 42c is required for the next subordinate screen 42, and the expert enters the appropriate type depending on how the know-how is to be imparted.

The item of data C2D1 once input by the expert in the input device 12 is again temporarily stored in the working memory unit 22 and the processor unit 14 is directed to seek mathematical and boolean expressions from the expert and/ or variables to determine the associative index to show the relationship between the item of data C2D1 to the next item of data C3D1.

The above steps are repeated at logic blocks 76 to 78 until the first item of data C1D1, . . . CND1 for all of the classes of information (up to class CN) has been inputted, associatively indexed and stored.

It is to be noted that the most superordinate screens 42 are generally choice screens 42a, the intermediate screens are usually input screens 42b (but can also be choice screens 42a) and the final screen 42 is an information screen 42c.

Then at the logic block 78 the instruction unit 20 directs the processor unit 14 to allow the expert to finish storing items of data into the class of information CN and to use the movement commands to go back to the previous screen 42 i.e. class C1. If there are further items of data to store a branch is taken back to logic block 76 and the expert continues as before.

If not the process continues to logic block 78 where the expert may use the movement commands to enter items of data for superordinate screens 42—the commands being PREVIOUS and FIRST. The expert then enters in the rest of the items of data for the previous superordinate screens 42 (in class C(N-1)) and they are associatively indexed and stored as described hereinabove.

Figure 7:
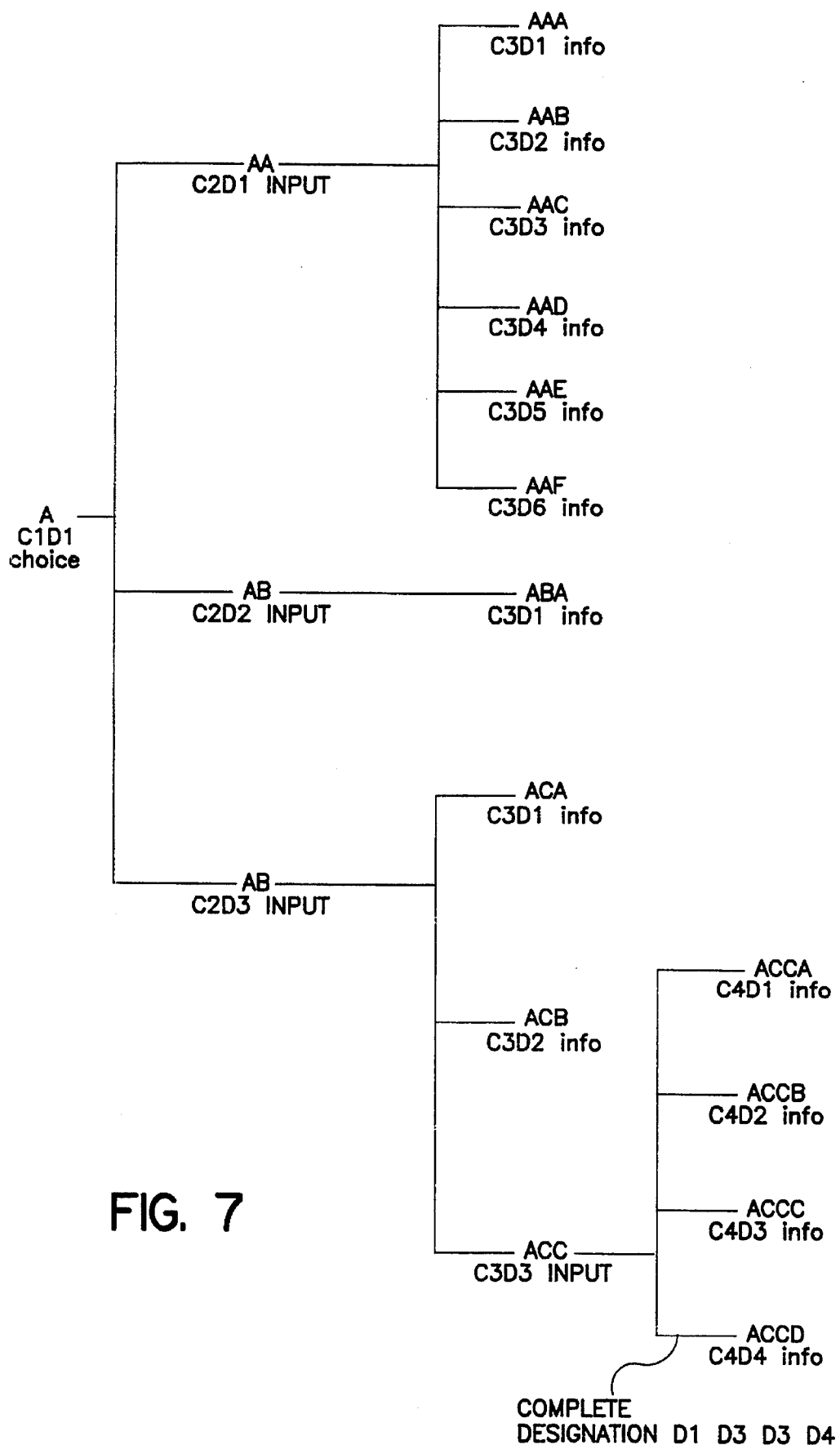
FIG. 7 is a tree diagram similar to that of FIG. 2 but corresponding to Example 1.

This continues back through logic blocks 80 and 82 and with branches back to logic blocks 74 and 72 until all know-how associates with the item of data C1D1 is stored with associative indexes. This is equivalent to entry of all the know-how for screens dependant on screen AA as shown in FIG. 7, that the expert wishes to provide.

Then the second item of data D2 for the class of information C1 is processed similarly. The above described steps are then all repeated until all of the items of data are processed.

In summary, the data storage process comprises the following steps:
a) allowing input of an item via the input device 12 into the data storage and retrieval system 10;
b) generating an associative index for the item of data to associate the item of data with items of related data contained in superior classes of information and in the same class of information and to distinguish the item of data from other items of data in the same class of information;
c) labelling the item of data with the associative index;
d) storing the item of data in the general data memory unit in the indexed data memory unit 26;
e) allowing input of an item of data of a first subordinate class of information via the input device 12;
f) repeating steps (a) to (d) supra for all remaining subordinate classes of information in order of decreasing superiority;
g) repeating step (f) supra for the most subordinate class of information; and
h) repeating step (g) supra for the next most superior class of information until all items of data relating to all of the classes of information have been stored.

The system 10 now is supplied with the know-how and common sense of the expert of the subject and which is associatively stored.

The mathematical expressions and variables used to generate the associative indexes may be defined globally and/or locally. One way of achieving local definition is to use an array type identification such as R(x,y) where R is the variable, x designates how many screens 42 above the present screen 42 the variable originates from and y indicates which variable from that screen 42. This is referred to as using local variables.

Each mathematical expression of the active screen 42 then has a real local variable designation such as R(0,1), R(0,2) . . . and could have complex local variable designations such as C(0,1), C(0,2) . . . Again the first number in the parenthesis designates the screen 42 of origin and the second number the variable number on that screen 42.

The present invention will hereinafter be described with particular reference to use of global variables. Global variables are prefered since meaningful designations or tokens) can be given to the variables whereas the variables in local definition must be remembered and change for each screen 42.

The expert then enters logical expressions into the area 54 with expression designations in the logical variable area 56.

Each boolean expression is then assessed using the real and/or complex variables and the input variables from the user and the output variables from superordinate screens 42.

For each logical expression in a screen 42 there is another screen 42, and for each logical expression in that screen 42 there is yet another, as shown in FIGS. 2 and 7.

Hence, it is the logical expressions that lead directly to subordinate associated know-how and the actual screens 42 arrived at depend on answers by the user to the questions or the users selection between the choices in the areas 46. The mathematical expressions by their effect on the logical expressions lead indirectly to subordinate know-how.

Still in the Expert mode there is an EDIT process represented by logic blocks 90 to 104 inclusive as shown in FIG. 4. Editing is by ADDING, AMENDING and DELETING items of data at the desired class of information in the desired branch of the structure.

For example, logic block 90 taps into the logic block 70 of the data storage process for the most superordinate class of information, via logic block 92. Once the tap is made the adding of data is identical to the process of STORAGE of data.

AMENDING of items of data and including the mathematical and boolean expressions and variables is by a text editor of conventional type. For example, using Alt M to open text for amending and Ctr W to close and store the amended text. DELETING of items of data is on a screen 42 by screen 42 basis and leads to deletion of subordinates screens 42 simultaneously.

Logic blocks 96, 100 and 104 function similarly for classes C2, C3 and CN.

The logic blocks 90, 94, 98 and 102 allow the expert to choose between EDITING the present information and associative indexes, MOVING to another class (FIRST, NEXT, PREVIOUS as described hereinabove) and ending the EDITING.

The said blocks 90, 94, 98 and 102 also allow for crosslinking of branches, addition of screens 42 with the tree T (i.e. editing the tree structure) and rearranging the order of the boolean expressions.

A logic block 88 is provided for choosing between STORING and EDITING the information and associative indexes. Logic blocks 106 and 108 represent the end of STORING, and EDITING respectively, with a logic block 110 representing the start of the STORE/EDIT processes.

In summary the process for data editing comprises the steps
a) allowing selection of one of the items of data to be edited in a particular class of information;
b) using the associative indexes to locate tile item of data to be edited in the indexed data memory unit 26;
c) allowing editing of the item of data located in step (b) supra; and where editing is deleting of the item of data;
d) using the associative index for the item of data to locate all related items of data in subordinate classes of information; and
e) deleting the related items of data location in step (d supra.

Figure 5:
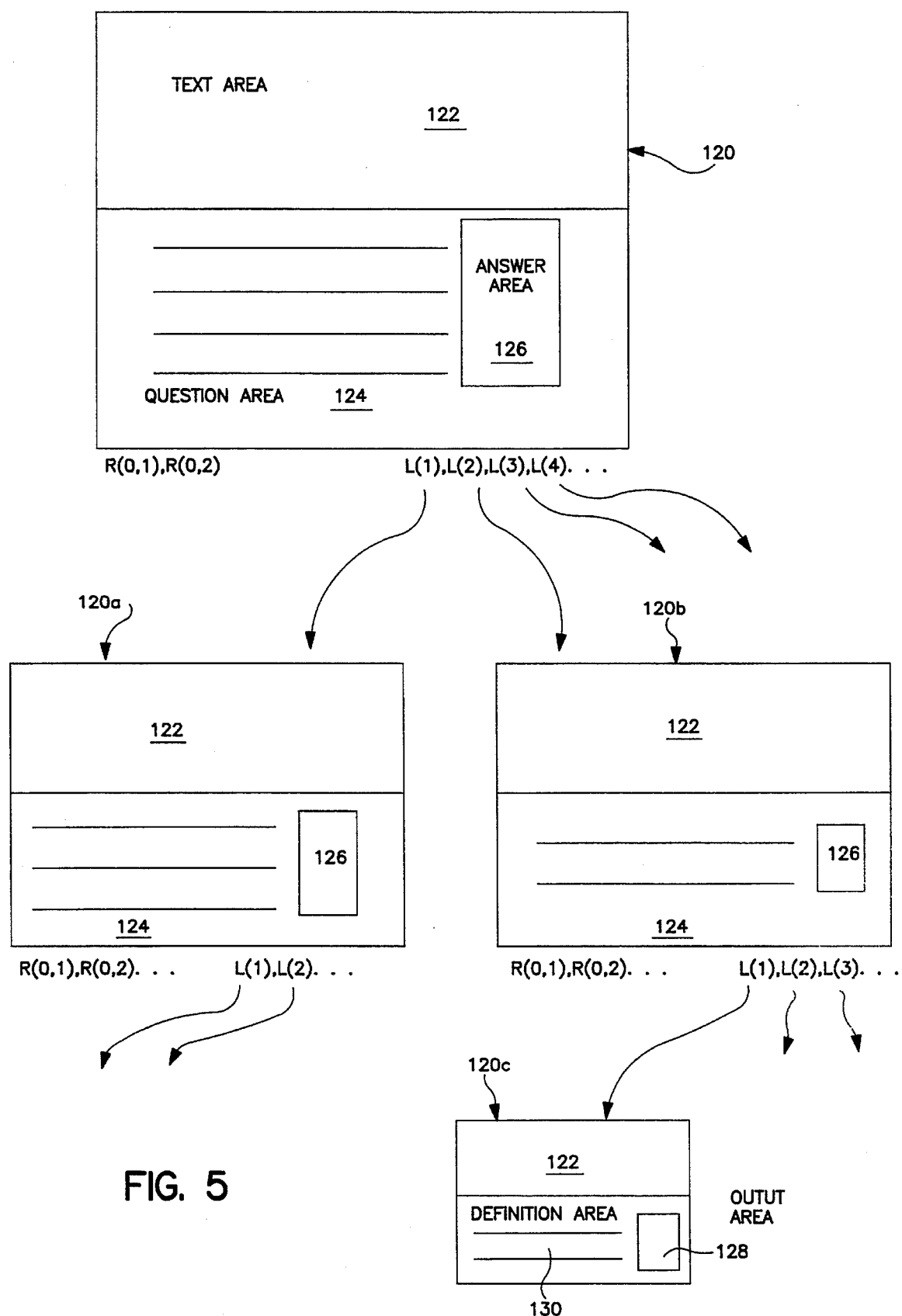
FIG. 5 is a process representation corresponding to that of FIG. 3 but for a Run mode of operation.

Shown in FIG. 5 is a schematic flow diagram of a Run mode of operation of the system 10, for use by a non expert user, for which the VDU has a screen 120 which typically comprises a text area 122, a question area 124 and an answer area 126. The screens 120 are of three types including choice screens 120a, input screens 120b and information screens 120c, (shown in FIGS. 11, 12 and 13, respectively) which correspond to the screens 42a, 42b and 42c respectively.

The text area 122 displays text entered by the expert on the particular subject or field. The question area 124 has choices or questions entered by the expert in area 44, such as requiring input of values or choices to be made by the user.

In the information screen 120c in FIG. 13 the areas 124 and 126 are replaced by a mathematical output area 128 and a definition area 130 which correspond to the areas 60 and 62 respectively.

The answer area 126 receives answers by the user via the input device 12 which answers correspond to the input variables I(i) for the mathematical and boolean expressions, where appropriate. The choice screens 120a may not always have mathematical expressions and the information screens 120c do not have boolean expressions, whilst the input screens 120b usually have both.

For the choice screen 120a the choice made (either in the area 126 or by highlighting one of the lines in the area 124) by the user gives values to the input variable I(1) and to the boolean variable L(1), L(2) ... as shown in FIGS. 8 and 9.

For the input screen 120b (and some of the choice screens 102c) the data input by the user is accepted and used by the first determing means 38 of the associative index means 36 and gives values to the mathematical expressions and variables and the second determining means 40 uses these to evaluate the boolean expressions and variables to determine which further screens 42 are relevant for the particular circumstances of input variables and mathematical variables set by the user.

Figure 6:
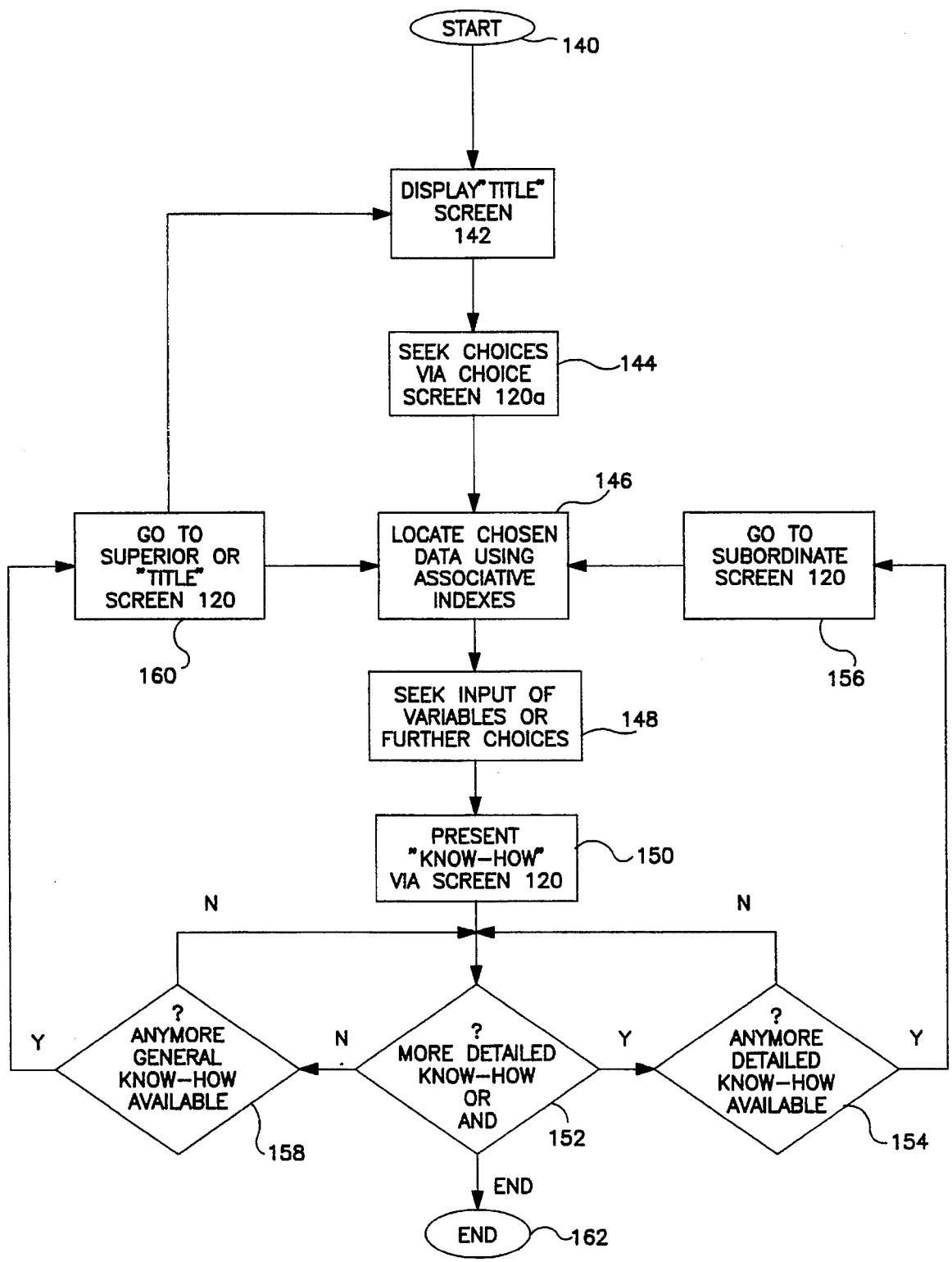
FIG. 6 is a flow diagram of operation of the system of FIG. 1 in the Run mode where the know-how is retrieved by a user.

For the information screen 120c no data is required from the user—the process here gives know-how to the user. As shown in FIG. 5 the screens 120 can be thought of as being a tree of screens 120 linked by the logical variables L(1), L(2) and by mathematical variables R(i,j) determined by the mathematical expressions, which together constitute the associative indexes. For convenience mathematical variables in FIG. 5 are shown in local format for real variables, i.e. not global and not for complex variables. The Run mode process is represented by logic blocks 140 to 162 in FIG. 6. The user is first presented with the most superior screen 120 and is asked to choose what know-how is required in greater detail (logic blocks 142 and 144). The associative index means 36 by the second determining means 40 then uses the boolean expression made true by the users choice to locate the appropriate children 120, (logic block 146), which then displays requests for input of variables or for choices to the user by the instruction means 20 (logic block 148). Simultaneously, know-how is presented by the screen 120 (logic block 150).

The user may now seek more or less detailed know-how related to the superior know-how already provided. Where more detailed know-how is required the logic block 152 branches back to logic block 146 via logic blocks 154 and 156. In logic blocks 154a check is made to see that there is more detailed know-how to be given and if not reverts to logic block 152, and if so continues to logic block 156. By this all of the know-how available can be extracted and the boundaries of that know-how can be well defined and known to the user. The 158 sets the instruction unit 20 to search for a subordinate screen 120.

The instructions means 20 and the associative index means 36 then operate the first and second determining means 38 asnd 40 to determine the mathematical and boolean expressions based on the input variables provided by the user and output variables from superordinate screens 120 where applicable. The instruction means 20 and the associative index means 36 then commence sequential execution of the logical expressions until one returns a true logic value (logic block 146).

The associative index means 36 then uses the data in the childscreen area 58 to locate the childscreen 120 and to extract the data for that screen 120 indicated as subordinate by the executed logic expression (logic block 146).

The above process is repeated by the user until he/she has gained the know-how required for the particular task. Less detailed or more detailed know-how can be obtained by use of logic blocks 158 and 160 which correspond to logic blocks 154 and 156. Logic blocks 160 also allows for reverting of control back to the most superior or First screen 120 (referred to as the Title screen 120) so as to then quickly allow change to another branch of the know-how to tree.

In the run mode the instructions means 20 allows the user to go backward and forward to superordinate and subordinate data so as to be able to effect interpolations in the EMB 10 for the subject or field of interest.

In summary the run mode process comprises the steps
a) displaying the most superior screen 120 of information;
b) allowing selection of items of data from the screen 120;
c) determining the associative indexes therefor;
d) locating the items of data using the asociative indexes;
e) displaying the screen 120 for selected item of data;
f) allowing for selection of more detailed or more general know-how; and
g) repeating steps (b) to (f) supra for locating and displaying that know-how.

It is envisaged that the instruction unit 20 could be configured to provide the expert (in the Expert mode) with reminder statements for the input variables I and mathematical variables R so that the physical meaning and dimensions of same may be readily available to the expert whilst preparing subordinate screens 42 or editing, with locally defined variables. This may be achieved by provision of a scrollable list of variables and their identity at a screen 42 being stored or edited. This may also be achieved by providing a reminder line with each mathematical expression line. Also a window could be provided to show the physical meanings and dimensions, screen at a time with the last screen as the default. Further, a counter could be provided in the instruction unit 20 to display the relative symbol for the variable, eg. R (x,y) which is correct for the current screen 42. It is to be noted that the relative designation R (x,y) for a particular variable will vary depending on how many screens 42 ago it was generated. For example, R (3,4) from the 6th screen 42 becomes R (5,4) from the 8th screen 42.

By the instruction unit 20 the user is given access to the screens 42 but without editing facilities, so as to allow the user to verify the accuracy of the know-how provided and the standing of the authority behind same before using the expertise in the EMB 10. This capability of EMB 10 makes them very well suited to applications where the user has a legal or other obligation to satisfy him/herself in the accuracy and standing of the know-how in the EMB 10. The instruction unit 20 is also configured to print Out the description, input variables, output variables and mathematical and boolean expressions for each screen so as to assist in determining the accuracy of the know-how.

The invention will now be considered in the light of the following practical example relating to gold cyanidation in stirred tanks.

EXAMPLE 1

In this example cyanide leaching of gold is considered with know-how to infer approximate leach kinetics from certain plant data provided by a user of the EMB 10.

Here screens 42 are conveniently referred to as pages, There is a page A at which the EMB 10 begins and provides chains leading to pages AA to AC. These pages, in turn have childpages AAA to AAF; ABA; and ACA to ACC, respectively. Of these childpage ACC has further childpages ACCA to ACCC. This is shown diagrammatically in FIG. 7.

The childscreens are all arrived at by use of the boolean expressions.

Where the term "calls" is used in the example it refers to use of the associative index process of the present invention.

The type of Page 42 is given in square brackets.

electroMAGNETIC Book demonstration CYANIDE LEACHING OF GOLD

A Starting page [choice page 42a]

A.1 Text

This demonstration concerns gold cyanidation in stirred tanks. You can infer leach kinetics from plant data, or examine the typical influence at fullscale of variables such as

| | |
|---|---|
| Number of tanks | Tank volume |
| Agitation power input | Feedrate |
| Solids density | Cyanide concentration |
| pH | Dissolved oxygen levels |
| Ambient temperature | |

A.2 Choices

A.2.1 Infer leach kinetics from plant data. [Calls page AA]
A.2.2 Develop optimised design. [Calls page AB]
A.2.3 Assess impact of controllable variables, [Calls page AC]

AA Infer leach kinetics from plant data [Input page 42b]

AA.1 Text

This module of expertise shows how easy interactive operation is- Leach information is derived from plant data. A graphical plot of:

log ([head grade/[residue assay]) versus [tank number]

is suggested to smooth the data from the last five tanks. Points are read off the curve at each tank number and the corresponding smoothed estimate of the residue assay for that tank number is calculated as:

[head assay]*(exp[value read off])

AA.2 Data input

[Calls page AAA when complete]

$I[1]$ Solids residue out of last tank [g Au/]
$I[2]$ Solids residue out of 2nd-last tank [g Au/]
$I[3]$ Solids residue out of 3rd-last tank [g Au/]
$I[4]$ Solids residue out of 4th-last tank [g Au/]
$I[5]$ Solids residue out of 5th-last tank [g Au/]
$I[6]$ Number of tanks above 5th tank [dimensionless]
$I[7]$ Head grade [g Au/t]
$I[8]$ Slurry residence time per tank [hour]

AA.3 Mathematical expressions

AA.3.1 Residue multiplier, last tank $$M1 = I[1]/I[2]\}$$

AA.3.2 Residue multiplier, 2nd-last tank $$M2 = I[2]/I[3]\}$$

AA.3.3 Residue multiplier, 3rd-last tank $$M3 = I[3]/I[4]\}$$

AA.3.4 Insoluble fraction $$AuI = ((M2)\ 2 - M1*M3)/(2*M3 - (M1+M2))$$

AA.3.5 RMS corrected residue multiplier $$MR = (I[1] - AuI)/(I[5] - AuI)\ 0.25$$

AA.3.6 First order rate constant [/hour]

$$K = (1 + 1/MR)/I[8]$$

AA.3.7 Fraction slow-leaching gold $$FS = (I[1] - AuI)/((MR^-(5+I[6]))*(I[7]))$$

AA.3.8 Head grade $$AuH = I[7]$$

AA.3.9 RMS residue multiplier $$MR2 = (I[1]/(I[5])0.25$$

AA.3.10 First order rate constant : no unleachable gold [hour]

$$K1 = (1 + 1/MR2)/I[8]$$

AA.3.11 Fraction slow-leaching gold: no unleachable gold $$FS1 = I[1]/((MR2(5+I[6]))*(I[7]))$$

AA.4 Boolean expressions

AA.4.1 Correcting negative insoluble gold fraction—slow leach $$AuI < 0\ AND\ K1 < 0.03\ \text{[Calls page AAA]}$$

A.4.2 Correcting negative insoluble gold fraction—fast leach $$AuI < 0\ AND\ K1 > 0.3\ \text{[Calls page AAB]}$$

AA.4.3 Correcting negative insoluble gold fraction $$AuI < 0\ \text{[Calls page AAC]}$$

AA.4.4 Slow leach $$K < 0.03\ \text{[Calls page AAD]}$$

AA.4.5 Fast leach $$K > 0.3\ \text{[Calls page AAE]}$$

AA.4.6 Default calls up page AAF.

AAA Corrects for negative insoluble Bold fraction [Information Page 42c]

AAA.1 Text

All the gold is soluble—albeit slowly. Only the slow leaching fractions has been evaluated, since only this fraction is of importance in assessing final residues and incremental recoveries. The slow-leaching gold has been fitted with a first-order rate model, Where the solution tenors at the top of the circuit are important, eg to determine achievable carbon loadings, the fast-leaching fraction also needs to be assessed.

The relatively slow rate constant indicates that removal of coarsegold, pretreatment or altering the leach conditions be considered. Refer to the electroMAGNETIC Book on improving gold extraction.

AAA.1 Computation output lead grade [g Au/t]=AuH
Slow-leaching fraction=FS1
Rate constant of slowleaching fraction [/hour]=K1

AAB Corrects for negative insoluble gold fraction [Information Page 42c]

AAB.1 Text

All the gold is soluble. The leach rate of the slow-leaching fraction is higher than normal. Although not necessarily incorrect, the data should be checked. Only this slow leaching fraction has been evaluated, since normally only this fraction is of importance in assessing final residues and incremental recoveries. However with such a high leach rate for the slow-caching gold, fast-leaching gold could also affect residue estimates. The slow-leaching gold has been fitted with a first-order rate model. Where the solution tenors at the top of the circuit are important, eg to determine achievable carbon loadings, the fast-leaching fraction also needs to be assessed.

AAB.1 Computation output

Head grade [g Au/t]=AuH
Slow-leaching fraction—FS1
Rate constant of slowleaching fraction [/hour]=K1

AAC Corrects for negative insoluble gold [Information Page 42c]

AAC.1 Text

All the gold is soluble. Only the slow leaching fraction has been evaluated, since only this fraction is of importance in assessing final residues and incremental recoveries. The slow-leaching gold has been fitted with a first-order rate model. Where the solution tenors at the top of the circuit are important, eg to determine achievable carbon loadings, the fast-leaching fraction also needs to be assessed.

AAC.1 Computation output

Head grade [g Au/t]=AuH
Slow-leaching fraction=FS1
Rate constant of slowleaching fraction [/hour]=K1

AAD Presents leach kinetic data—slow kinetics [Information Page 42c]

AAD.1 Text

The slow leaching gold leaches unusually slowly. Only the slow and non-leaching fractions have been evaluated, since only these are of importance in assessing final residues and incremental recoveries as in this memory module. The slow-leaching gold has been fitted with a first-order rate model. Where the solution tenors at the top of the circuit are important, eg to determine achievable carbon loadings, the fast-leaching fraction also needs to be assessed. The relatively slow rate constant indicates that removal of coarsegold, pretreatment or altering the leach conditions be considered. Refer to the electroMAGNETIC Book on improving gold extraction.

AAD.1 Computation output

Head grade [g Au/t]=AuH
Slow-leaching fraction=FS
Rate constant of slowleaching fraction [/hour]=K
Insoluble fraction=AuI

AAE Presents leach kinetic data—fast kinetics [Information Page 42c]

AAE.1 Text

The leach rate of the slow-leaching fraction is higher than normal. Although not necessarily incorrect, the data should be checked. Only the slow and non-leaching fractions have been evaluated, since only these are of importance in assessing final residues and incremental recoveries as in this memory module. The slow-leaching gold has been fitted with a first-order rate model. Where the solution tenors at the top of the circuit are important, eg to determine achievable carbon loadings, the fast-leaching fraction also needs to be assessed.

AAE.1 Computation output

Head grade [g Au/t]=AuH
Slow-leaching fraction=FS
Rate constant of slowleaching fraction [/hour]=K
Insoluble fraction=AuI

AAF Presents leach kinetic data [Information Page 42c]

AAF.1 Text

Only the slow and non-leaching fractions have been evaluated, since only these are of importance in assessing final residues and incremental recoveries as in this memory module. The slow-leaching gold has been fitted with a first-order rate model. Where the solution tenors at the top of the circuit are important, eg to determine achievable carbon loadings, the fast-leaching fraction also needs to be assessed.

AAF.1 Computation output

Head grade [g Au/t]=AuH
Slow-leaching fraction=FS
Rate constant of slowleaching fraction [/hour]=K
Insoluble fraction=AuI

19

AB Develop optimised design [Input Page 42b]

AB.1 Text

The installed tankage determines the leach recovery of gold. As the residence time of the slurry is increased, so the recovery of gold is increased. However there are diminishing returns, as the incremental increase in gold recovery drops the greater tankage the provided. In an optimised design, the increment of cost to implement the marginal volume and number of tanks can be justified against a preset payback time. In the gold industry this generally ranges from 10 to 40 months.

AB.2 Data input

I[1] Solids feedrate [tons per month]
I[2] Solids specific gravity [relative to water]
I[3] Solids content of slurry [% mass]
I[4] Gold content of solids [g Au/t]
I[5] Value of gold [$/g]
I[6] Proposed overall slurry residence time [hours]
I[7] Proposed number of tanks [dimensionless]
I[8] Cost of installed 300 cubic meter leach tank [$]

AB. 3 Mathematical expressions

AB.3.1 Slurry flowrate [cubic meters per hour]

$Q=I[1]*100*(I[2]-1)*((100-I[3])/100-1)/(I[2]*I[3]*740)$

AB.3.2 Slurry residence time in one tank $T=I[6]/I[7]$

AB.3.3 Residue in to last tank $Au2=I[4]*(0.6/((1+T)(I[7]-1))+0.35/((1+0.1*T)(I[7]-1)))$ AB.3.4 Residue out of last tank $Au2=I[4]*(0.6/((1+T)I[7])+0.35/((1+0.1*T)I[7]))$ AB.3.5 Incremental recovery in last tank $DELAU1=Au2-Au1$ AB.3.6 Monthly value of incremental recovery $MONTHV=I[1]*I[5]*DELAU1 * I[7]$ AB.3.7 Single tank cost $CTANK=I[8]*(((I[6]/I[7]*300)) 0.55)$ AB.3.8 Payback time $PLAYBACK=CTANK/MONTHV$

AB.4 Boolean expresions

None, default calls up page ABA when data input is complete.

ABA Presents payback time [Information Page 42C]

ABA.1 Text

The payback time is PAYBACK months.
Return to obtain estimates for other conditions.

20

AC Assess impact of controllable variables [Input Page 42b]

AC.1 Text

This section of the electroMAGNETIC Book demonstrates the power of this technology to provide quantitively directed expertise to users. The expert can protect you from specifying inappropriate conditions. Try for example to input very high or low agitator power inputs for the two alternative routes, or use inappropriate low pH or cyanide, dose.

AC.2 Data input

I[1] Number of tanks [dimensionless]
I[2] Volume of a single tank [cubic meters]
I[3] Agitation power input [kW per tank]
I[4] Solids feedrate [tons per hour]
I[5] Solids content of slurry [% mass]
I[6] Solids density [relative to water]
I[7] Ambient temperature [Degrees Centigrade]

AC.3 Mathematical expressions

AC.3.1 Mass of slurry in one tank [tons]

$TANKM=I[2]*I[5]*I[2]/((I[6]-1)*(100-I[5])+100)$

AC.3.2 Agitation power input [kW/ton slurry]

$UNIT POWER=I[3]/TANK M$

AC.3.3 Energy input [agitation power and temperature] factor $FACTOR=[1+UNITPOWER/1.2]*exp((UNITPOWER/1.2)*(60000/8.314)/(I[7]+273))$ AC.3.4 Number of tanks $N\ to\ T=I[1]$ AC.3.5 Mass of solids in one tank $Tank\ solids=I[6]*Tank\ M/100$ AC.3.6 Slurry residence time in one tank $T=Tanksolids$ AC.3.7 Power constant $CONSTANT=I[2]0.66$

AC.4 Boolean expressions

AC.4.1 Under-powered agitation $I[3]<0.20*CONSTANT$  [Calls page ACA]

AC.4.2 Overpowered agitation $I[3]>0.40*CONSTANT$  [Calls page ACB]

AC.4.3 Default calls up page ACC.

ACA Agitation under-powered [Information Page 42c]

ACA.1 Text

The amount of agitation power specified is inadequate, Return to increase, For detail design use standard combinations of gearbox/impellor and safety factors as specified in the electroMAGNETIC Book on specifying equipment for slurry agitation.

ACA.2 Computation output

Try agitator/impellor combination transferring [kW]= 0.27*CONSTANT

ACB Agitation over-powered [Information Page 42c]

ACB.1 Text

The amount of agitation power specified is excessive. Return to decrease. For detail design use standard combinations of gearbox/impellor and safety factors as specified in the electroMAGNETIC Book on specifying equipment for slurry agitation.

ACA.2 Computation output

Try agitator/impellor combination transferring [kW]= 0.27*CONSTANT]

ACC Effect of altering dissolved oxygen levels [Input Page 42b]

ACC.1 Text

This section of the electroMAGNETIC Book provides guidance on the benefits of boosting dissolved oxygen levels, and might suggest potentially more effective ways of enhancing the leaching rate.

ACC.2 Data input

I[1] Dissolved oxygen level [ppm Oxygen].
I[2] Cyanide concentration [ppm NaCN]
I[3] pH [dimensionless]

ACC.3 Mathematical expressions

ACC.3.1 Cyanide and pH correction factor $FACTOR1=100*(1+10^{(9.3-I[3])})/I[2]$

ACC.3.2 First order leach rate constant correction $FACTOR1 = FACTOR/(10/I[1]+FACTOR1)$ ACC.3.3 Residue of fast-leaching gold out of last tank [fraction]

$RF=0.6/((I+T*FACTOR2)^{NTOT}$

ACC.3.4 Residue of slow-leaching gold out of last tank [fraction]

$RS=0.35/((1+0.1*T*FACTOR2)^{NTOT})$

ACC.3.5 Overall recovery [%]

$RECOVERY=(1-0.05-RF-RS)*100$

ACC.3.6 Fraction cyanide in reactive ionic form $FC=1/(1+10^{(9.3-I[1])})$

ACC.3.7 Cyanide concentration $CN=I[2]$

ACC.4 Boolean equations

ACC.4.1 Prussic acid level high $I[2]<100*I[1]$ [Calls page ACCA]

ACC.4.2 pH limitation significant $I[2]<100*I[1]$ and $I[3]<9$ [Calls page ACCB]

ACC.4.3 Cyanide limitation significant $I[2]<30*I[2]$ [Calls page ACCC]

ACC.4.3 None of the above, workable reaction calls ACCD.

ACCA Prussic acid level too high [Information Page 42c]

ACCA.1 Text

The high cyanide level and low pH creates a high risk of Prussic acid poisoning, especially in confined areas with limited air dilution. Either should be decreased. Up to 25 ppm produces slight poisoning symptoms after several hours, 100 ppm is fatal within one hour. 180 ppm is fatal within 10 minutes, Over 270 ppm is immediately fatal.

ACCA.2 Computation output

Maximum potential Prussic acid concentrations [ppm]= 0.25*CN* (1–FC)

ACCB pH limitation significant [Information Page 42c]

ACCB.1 Text

The low pH limits the rate of leaching significantly. You should increase it.

ACCB.2 Computation output

The cyanide and/or pH levels are too low. Either should be increased.

The reactive ionized cyanide level is [ppm NaCN]= CN * FC

ACCC Cyanide limitation significant [Information Page 42c]

ACCC.1 Text

The quantity of cyanide available for leaching is inadequate, and has significantly limited the rate of leaching. You may wish to increase it.

ACCC.2 Computation output

The reactive ionized cyanide level is [ppm NaCN]= CN * FC

ACCD Reaction Results [Information Page 42c]

ACCD.1 Text

Return one page to change dissolved oxygen, cyanide level or pH, or two pages to change:

| Number of tanks | Tank volume |
| --- | --- |
| Agitation power input | Feedrate |

| Solids density | Ambient temperature |
| --- | --- |

A more extensive model could include cyanide stage addition, breakdown down the tank train and the effect of carbon thereon, as well as the effect of slurry viscosity modifiers.

ACCD.2 Computation output

The overall recovery=RECOVERY %

[Maximum recovery, due to liberation=95%

It is to be noted that the areas 44, 50 to 56, 60, 62, 122 and 130 may be scrollable to allow access to more text than could fit in those areas individually. The input area 46, 124,126 is preferably not scrollable since it is preferred to be able to use all of the choices or inputs required, altogether.

It is envisaged that an audit trail may be kept by the EMB 10 to keep a record indicating the route by which know-how was arrived at in the EMB 10, that is by keeping a record of the associative indexes used in extracting the know-how and the mathematical and boolean variables therefor. By virtue of use of the EMB 10 of the present invention it is possible for a relatively non skilled person to gain know-how or the benefit of know-how in a subject or field in which he/she has little or no background but where he/she can provide answers to questions asked by the EMB 10. Also, an expert can readily and relatively easily put his know-how and common sense into the EMB 10 and also to edit and audit same.

The user does not have to formulate careful questions to ask the system as is the case with ES's, and all of the know-how contained in the EMB 10 can be extracted and readily printed out for purposes of validation and the like.

By the EMB of the present invention the user gets real decision support and instructions with analysis of alternatives via iteration.

The great problem of prior art systems, such as hypermedia products, is that the more detailed or more general information which is required will depend upon the task at hand and so facility must be provided to interact with a user to determine how the requirements of the task at hand should affect the information given. The present invention achieves this by embedding the experts know-how by use of the associative indexes.

The associative indexes ensure that the information given is tailored to the task at hand, i.e. it is neither superabundant nor deficient for the purpose at hand—this is in effect the know-how of what information to use and what not to use. The inability to tailor the information is the great failing of hypermedia products.

It is to be noted that the present invention can be used provide a conventional tree structure or a hyperstructure such as provided by crosslinking as exemplified on FIG. 2 by link Z—Z.

Modifications and variations such as would be apparent to a skilled addressee are deemed within the scope of the present invention. For example, a boolean expression could be configured to trigger the execution of a computer programme. This could be used as an alternative to display of an information screen 120c.

What I claim is

1. A data storage and retrieval system for storing and retrieving a plurality of items of data, comprising:

an input device for inputting items of variable data input;

an output device for outputting items of data of said plurality of items;

an indexed data memory unit including a general data memory unit and an associative index means operatively associated with said general data memory unit;

wherein said general data memory unit comprises means for storing said plurality of items of data including a plurality of expressions for interrelating said items of data, said plurality of expressions including at least one mathematical expression and at least one logical expression, said plurality of items of data being arranged in classes of information corresponding to a plurality of levels of specificity and including a major class of information $C_1$ and a plurality of classes of information $C_2, \ldots, C_N$ which are progressively more specific than said major class of information $C_1$ said plurality of classes of information being arranged in a hierarchical structure wherein said major class of information and said plurality of classes of information are arranged in order of increasing specificity, each class of information having a plurality of members $M_1, M_2, \ldots, M_i$, and each member having at least one of said plurality of items of data;

and wherein said associative index means comprises:

(i) a first determining means for determining first indexes from said mathematical expression using said items of variable data input;

(ii) a second determining means for determining second indexes from said logical expression using said items of variable data input and using said first indexes, said second determining means being in operative association with said first determining means, said second indexes determining a location of related items of data which are related to a chosen item of data for which said first and second indexes are determined; and (iii) means for selecting and retrieving said related items of data from a selected member of a class of information from said general data memory unit; and a data processing unit connected between said input device, said output device and said indexed data memory unit for controlling communication therebetween.

2. A data storage and retrieval system for storing and retrieving items of data referred to as "know-how", the know-how being the ingenuity, aptitude and skill of a person skilled in relation to a particular field of endeavor presented as a plurality of items of data, the know-how being intended to be retrieved and used by a person who is relatively unskilled in said field of endeavor, the data storage and retrieval system comprising:

a) an input device for input of items of variable data input by a user of the data storage and retrieval system;

b) an output device for output of items of data retrieved according to the variables;

c) an indexed data memory unit comprising a general data memory unit and an associative index means, the indexed data memory unit for storing the plurality of items of data relating to the know-how into the general data memory unit, the plurality of items of data including a plurality of expressions wherein the expressions are chosen from a group of expressions consisting of at least one mathematical expression, at least one logical expression and a combination of at least one mathematical expression and at least one logical expression, and the plurality of items of data being arranged in a plurality of classes of information $C_1, C_2, \ldots, C_N$, the classes of information being arranged in a hierarchical structure, the hierarchical structure consisting of a major class of information $C_1$ and a plurality of subordinate classes of information $C_2, \ldots, C_N$, the information contained in the items of data in the subordinate classes of information being progressively more specific for classes of information located further into the hierarchical structure, each class of information having a plurality of members $M_1, M_2, \ldots, M_I$ and each member having a plurality of the items of data and, i) the general data memory unit comprising means for receiving the plurality of items of data; and ii) the associative index means being in operative association with the general data memory unit, the associative index means comprising:

I) a first determining means for determining first indexes from both the mathematical expressions and the variables from the input device; and, II) a second determining means in operative association with the first determining means, the second determining means for determining second indexes from the logical expressions using the variables from the input device and the first indexes from the first determining means, the second indexes determining the location of items of data related to the items of data for which the first indexes and the second indexes are computed;

the associative index means further comprising means for:

receiving items of variable data from the input device;

selecting and retrieving items of data from the general data memory unit, the items of data corresponding to the items of data in a chosen one of the members $M_i$ in a chosen one of the classes of information $C_N$, the selection and retrieval of the items of data commencing with a first member $M_1$ of a major class of information $C_1$;

generating the first and the second indexes from the mathematical expressions and the logical expressions associated with the items of data in the chosen member $M_i$ of the chosen class of information $C_N$ and subject to the items of variable data input by the user;

using the first and the second indexes for locating a member $M_{ii}$ of a target class of information $C_{i+1}$ subordinate to the chosen class of information $C_i$, the target class of information $C_{i+1}$ having information more specific than that in the said chosen class of information $C_1$;

continuing to generate first and second indexes from further mathematical expressions and logical expressions associated with the items of data in the target class of information $C_{i+1}$ and subject to further items of variable data from the input device; and d) a data processor unit connected between the input device, the output device and the indexed data memory unit for controlling communication therebetween, wherein the data storage and retrieval system is devoid of means for searching for items of data with matching functions based on matching a set of keywords defining a document with a set of query words, and wherein the data storage and retrieval system is also devoid of inference engines and devoid of means for developing and using rules with the inference engines to search for the items of data.

3. A data storage and retrieval system according to claim 2, in which the index data memory unit has an uncertainty expression defining the degree of certainty of the know-how retrieved from the general data memory unit for a situation defined by the items of variable data, the uncertainty expression being computed from the values computed for the mathematical expressions and the logical expressions.

4. A data storage and retrieval system according to claim 2, in which the associative index means comprises means for creating a list of the first and second indexes computed by the first and the second determining means whilst retrieving the know-how, the list constituting an audit trail showing the route by which the know-how was retrieved, the indexed data memory unit also comprising means for initiating output of the audit trail via the output device.

5. The data storage and retrieval system according to claim 3, wherein the output means comprises means for displaying the uncertainty expression to the user for indicating the accuracy of the know-how retrieved from the system based on the variable data input by the user, wherein the uncertainty expression is expressed by the output means in a manner comprehensible to the unskilled person for determining the accuracy of the know-how retrieved for a situation defined by the items of variable input data.

\* \* \* \* \*